UNITED STATES PATENT OFFICE.

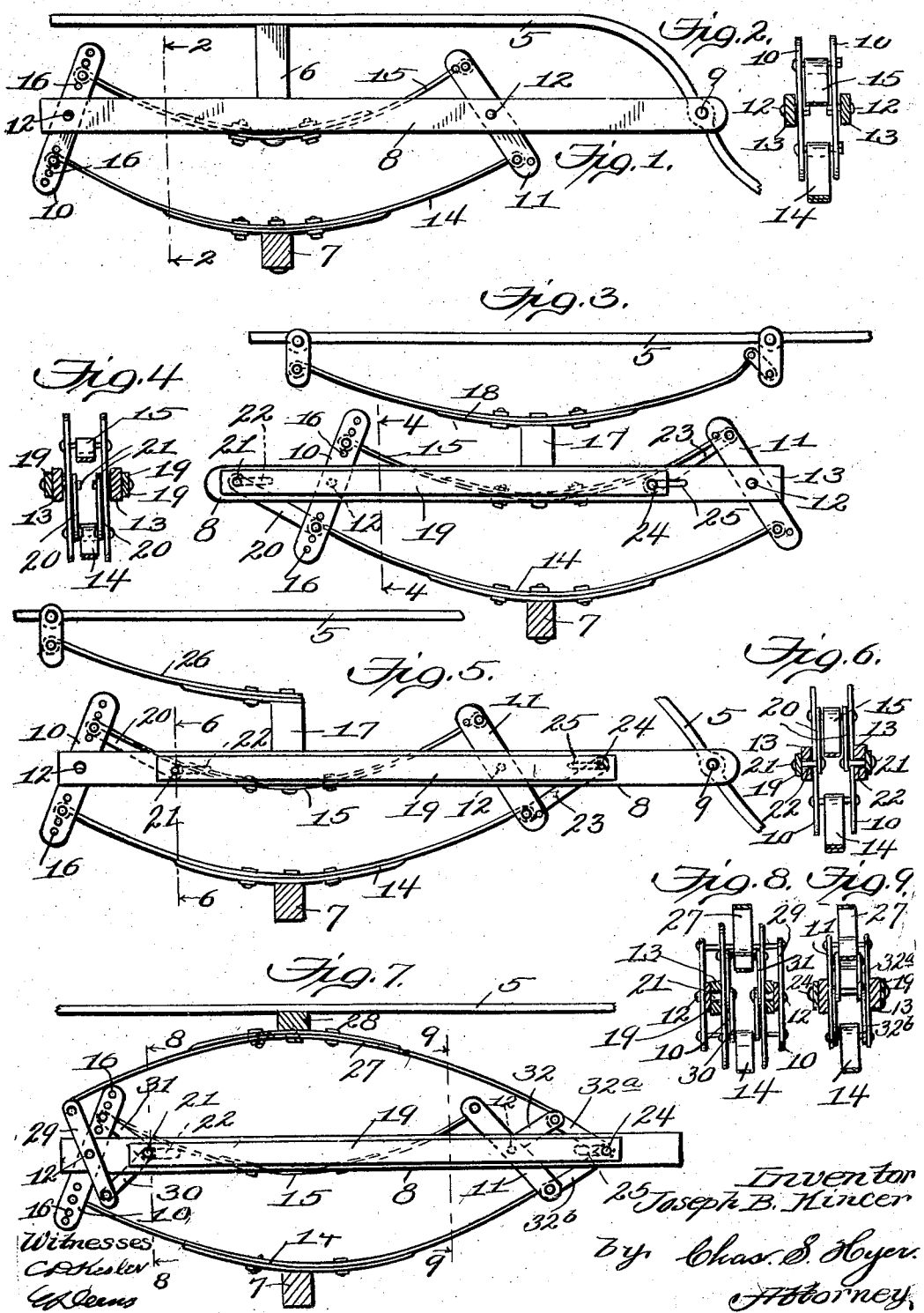

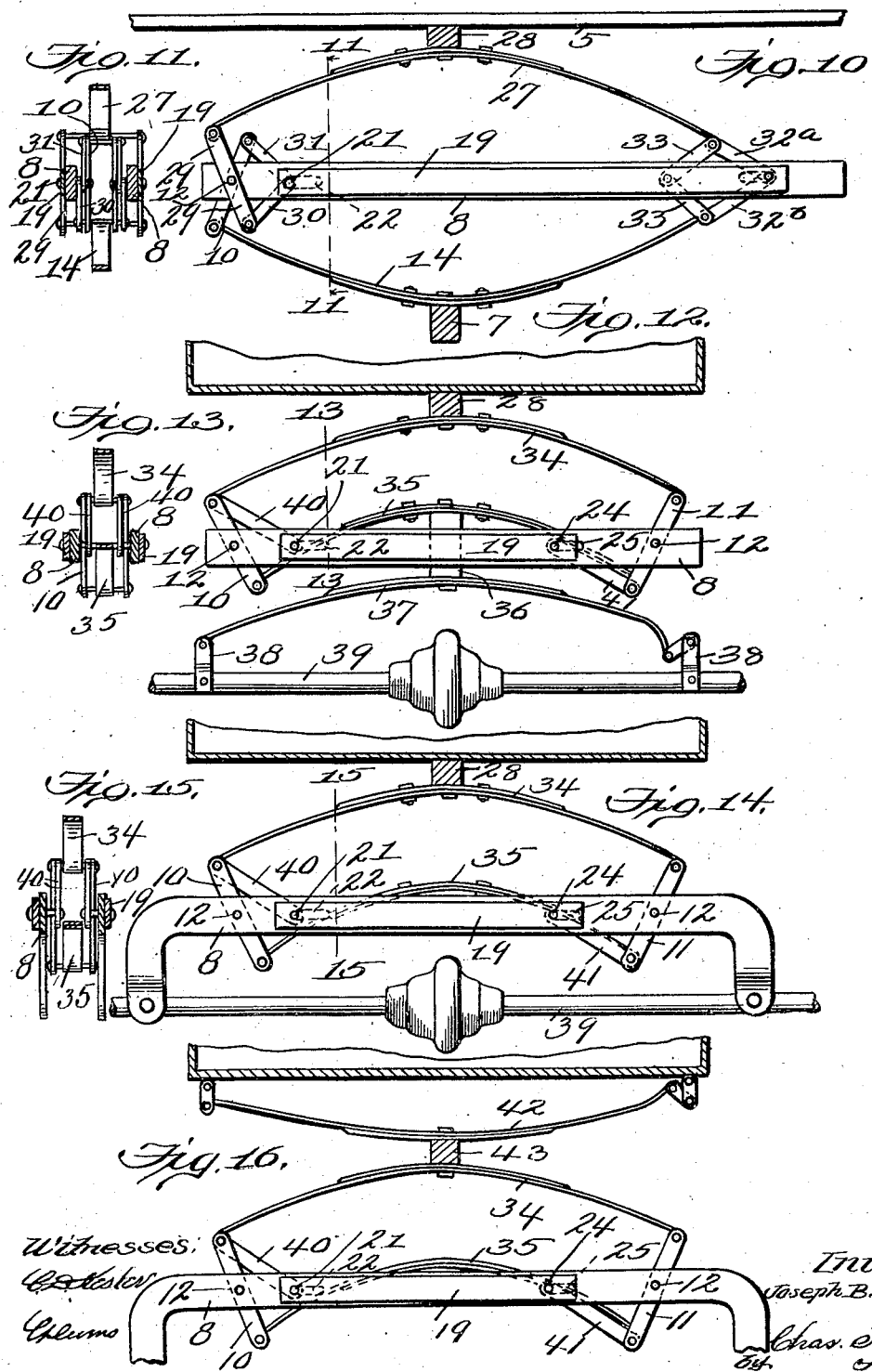

JOSEPH B. KINCER, OF WASHINGTON, DISTRICT OF COLUMBIA.

VEHICLE-SPRING.

1,341,805.  Specification of Letters Patent. Patented June 1, 1920.

Application filed September 9, 1915. Serial No. 49,727.

*To all whom it may concern:*

Be it known that I, JOSEPH B. KINCER, a citizen of the United States, residing at Washington, in the District of Columbia, have invented certain new and useful Improvements in Vehicle-Springs, of which the following is a specification.

This invention relates to vehicle springs, and especially that type adapted for automobiles and like vehicles, and consists essentially in a special group arrangement or coordination of springs connected by movable or shiftable members, such as arms or levers, to a horizontal intermediary support or frame in such manner that an extension of one spring under pressure resulting from a sudden upward thrust of the axle, over which the springs are grouped, will produce a compression in another spring of the group and thereby cause the axle and point of support for the vehicle bed to move toward each other and reduce the perpendicular distance between the axle and bed to a greater degree than is accomplished by the action of ordinary spring organizations now commonly used. This increased movement also operates to neutralize or suppress the rebound and sway of the spring organization or group of springs embodying the features of the invention when an abnormal pressure is suddenly relaxed therefrom.

When the axle of a vehicle or automobile is suddenly thrust upwardly, a considerable portion of this motion is communicated to and affects the body of the vehicle, and the occupants of the latter are subjected to a very disagreeable sensation. To obviate this disadvantage the ends of the springs of the usual spring organizations have been connected at times by auxiliary spiral springs and other analogous devices to allow the end of the lower spring, for instance, a greater upward oscillation than the connected end of the upper spring, but by this means the result sought has not been satisfactorily realized as the action of all the springs has been in the same upward direction or vertically, or the upward motion of the lower spring is imparted or transmitted to the upper spring through the medium of the auxiliary connecting spiral spring. The present improved spring organization accomplishes absorption or neutralization of upward thrusts, rebounds or sways and minimizes resultant movements of the vehicle body in a practical and efficient manner as the extension of one spring produces, through the movable connecting arms or levers embodying part of the improvement, a compression and reverse bend of another spring of the group to thus give the points of support on the respective springs a motion opposite to each other and results in a very small amount of the upward motion of the axle affecting the vehicle body and a consequent exceedingly smooth and quiet running motion of the vehicle.

The invention also consists in the preferred construction, arrangement and various applications of parts which will be more fully hereinafter described and claimed.

In the drawings:

Figure 1 is a side elevation of a portion of the frame or running gear of a vehicle showing one form of the improved spring organization applied thereto.

Fig. 2 is a transverse section of the line 2—2, Fig. 1.

Fig. 3 is a view similar to Fig. 1 of a modified form of the invention.

Fig. 4 is a transverse vertical section on the line 4—4, Fig. 3.

Fig. 5 is a view similar to Fig. 1 of a further modified form of the invention.

Fig. 6 is a transverse vertical section on the line 6—6, Fig. 5.

Fig. 7 is a view similar to Fig. 1 showing a further modified form of the invention.

Fig. 8 is a transverse vertical section on the line 8—8, Fig. 7.

Fig. 9 is a transverse vertical section on the line 9—9, Fig. 7.

Fig. 10 is a view similar to Fig. 1 showing a further modification.

Fig. 11 is a transverse vertical section on the line 11—11, Fig. 10.

Fig. 12 is a rear sectional end elevation of a portion of a body and axle of an automobile showing the features of the invention in further modified form and arranged across the end of the vehicle over the axle.

Fig. 13 is a transverse vertical section on the line 13—13, Fig. 12.

Fig. 14 is a view similar to Fig. 12 showing a further modification of the invention.

Fig. 15 is a transverse vertical section on the line 15—15, Fig. 14.

Fig. 16 is a view similar to Figs. 12 and 14 showing a still further modification of the invention.

The present improved spring organization may be applied to vehicles or any other mechanism with which it may have an advantageous association, but it is particularly intended for use with vehicles, such as motor vehicles or automobiles, having rebounding or swaying action when the springs thereof are suddenly thrust upwardly by the wheels engaging ruts or uneven road surfaces. As will be hereinafter specified, the novel arrangement of springs and accessories embodying the features of the invention may be disposed longitudinally of the running gear or extend transversely of the said gear over the rear axle, as may be desired and found best adapted to perform the function sought.

In the form of the spring organization shown by Figs. 1 and 2, the numeral 5 designates a part of the vehicle body or body frame; 6 a depending connecting member of the body; and 7 the axle beam or axle support, as the case may be, according to the particular vehicle structure to which the invention is applied. In this form of the organization an intermediary support or frame 8 is movably attached at one end to the body 5, as at 9, and to said support or frame 8 upwardly converged pairs of arms or levers 10 and 11 are intermediately pivoted by bolts 12. The intermediary support of frame 8 comprises two similar bars 13 of equal dimensions, with the arms or levers 10 and 11 arranged to freely move therebetween. Two superposed leaf bearing springs 14 and 15 are also included in this form of the improved organization, both springs having a downward convex trend with the concave sides uppermost, the lower spring 14 being slightly longer than the upper spring 15. The lower spring 14 is centrally secured to the axle beam or support 7, and the upper spring is centrally attached to the depending member 6. The ends of the springs 14 and 15 extend between and are pivotally or movably connected to the pairs of arms or levers 10 and 11 at points respectively above and below the intermediary support or frame 8. The arms or levers may, in part at least, be provided with a plurality of openings 16 or other form of attachment for adjustment of the springs relatively thereto, or to one pair of the arms or levers to regulate or modify the strength and sensitive action of the springs as may be desired and found necessary.

An upward thrust of the axle or axle beam 7 will correspondingly move the spring 14 at the center and by extension outwardly turn the lower extremities of the pairs of arms or levers 10 and 11 and force the upper extremities of said arms or levers inwardly and thus by compressing the center of the upper spring 15 give it an opposite direction of motion to that of the lower spring, the strain incident to such operation being taken up by the intermediary support or frame 8. As a consequence, when the springs are suddenly relieved of abnormal or excessive compression they will gradually and easily return to normal position or relax without vibratingly affecting the body of the vehicle, and at the same time the springs are strengthened in their action and imposition of sudden shocking and breaking strains on the springs is prevented.

In the form of the device shown by Figs. 3 and 4 a body connecting member, bolster or beam 17 is disposed below the vehicle body 5, and a third upper body supporting leaf spring 18 is pivotally attached at its ends to the body 5 and centrally to the top portion of the bolster or beam 17. In this instance the intermediary support 8 has the same form of bars 13 and in addition is provided with sliding or shifting compensators or bars 19 on the outer sides of the said bars 13. The springs 14 and 15 are below the spring 18, the spring 15 being centrally secured to the lower portion of the connecting member or beam 17 and the lower spring 14 centrally secured to the axle or axle beam 7 as in the first form. The ends of the springs 14 and 15 are similarly secured to the pairs of arms or levers 10 and 11 in like manner pivoted to the bars 13 of the intermediary support or frame 8, the lower ends of the arms or levers 10 in this instance having links 20 pivoted thereto and also to a bolt 21 slidable in slots 22 in the adjacent ends of the bars 13 of the intermediary support or frame 8 and terminally secured to the compensators or bars 19. The pair of arms or levers 11 has a pair of links 23 pivoted to the upper ends thereof and also to a bolt 24 engaging slots 25 adjacent to the opposite ends of the bars 13 and terminally secured to the opposite ends of the bars 19. The springs all have their concave sides uppermost, and the principle of operation thereof is similar to the first described form of the organization. The extra leaf spring 18 relieves the body of the vehicle of sudden upward or swaying movements to a greater extent than where only two leaf springs are used, and the compensator bars 19 unify or equalize the movements of the arms or levers 10 and 11, and render the action of the springs 14 and 15 in consonance; and so brace the arms or levers 10 and 11 as to synchronize their motions and obviate a longitudinal displacement of the springs 14 and 15 relatively to the support bars 19 when the axle receives a sudden longitudinal thrust or jar, and at the same time they materially strengthen the spring organization as a whole.

The form of the organization shown by Figs. 5 and 6 is very similar to that shown by Figs. 3 and 4 except that a half leaf spring 26 is secured to the body 5 instead of a complete spring, and the links 20 and 23 are reversed relatively to the ends of the arms or levers 10 and 11 to which they are attached. The links 20 are attached to the upper ends of the arms or levers 10, and the links 23 to the lower ends of the arms or levers 11. The operation of this form of the invention is practically the same as that shown by Figs. 4 and 5.

In the form of the organization shown by Figs. 7, 8 and 9, a leaf spring 27 with an upward convex trend is secured to the connecting member 28 secured to the body 5. The intermediary support or frame 8 with its compensators or bars 19, slots 22 and 25, bolts 21 and 24, and the arms or levers 10 and 11, having the springs 14 and 15 connected thereto, are all similar to the corresponding structures illustrated by Figs. 3, 4, 5 and 6 and have like operations and functions. The arms or levers 10, however, have auxiliary arms or levers 29 intermediately pivoted thereto, and to the upper ends of the latter arms or levers one end of the spring 27 is pivotally or movably connected. The lower ends of the levers or arms 29 are connected by links 30 to the bolt 21, and adjustably pivoted to the upper portions of said arms or levers 10 and to the said bolt 21 is a pair of links 31. At the point where the links 31 are attached to the arms or levers 10 the end of the leaf spring 15 is also connected. The leaf springs 14 and 15 are also adjustably connected to the arms or levers 10 in this instance as shown. The ends of the springs 27 and 14 opposite those attached to the arms or levers 29 and 10 are attached to the arms or levers 32 and 11 respectively as before, the arms or levers 11 having their lower extremities attached to the spring 14. Projecting from the levers 11 at an angle to the same are supplemental arms 32 which are also movably connected by links 32$^a$ to the bolts 24 movable in slots 25. The lower ends of arms or levers 11 are connected to bolts 24 by links 32$^b$. The spring 14 is centrally secured to the axle or axle beam 7 as in the previous structures, and an upward movement of said spring is caused through the same devices to compress the spring 15, which in this organization performs the functions of a take-up spring or shock absorber and not those of a bearing spring. These springs acting through the arms or levers and links as hereinbefore described tend to move the extremities of the spring 27 downwardly when an upward thrust is imparted to the axle, the bars 19 compensating the movements of the parts and also giving a very smooth action to the several springs when the latter are relieved of upward stress and return to normal position. In other words, the essential principle of operation of the preceding devices is fully embodied and becomes effective in the organization shown by Figs. 7, 8 and 9, and in this organization the ends of the two bearing springs 14 and 27 when the springs are subjected to abnormal stress move toward each other and thus neutralize or compensate for the vertical motion of the axle, imparting a minimum of such motion to the body.

Figs. 10 and 11 show a form of the organization which is practically the same as the organization shown by Figs. 7, 8 and 9, the difference being that spring 15 which serves as a take-up spring in the latter organization is omitted and also the arms or levers 11, the levers 33 performing the function of the arms or levers 11 and 32 as shown by Fig. 7. Like reference characters are applied to similar parts in the two organizations. The springs 14 and 27 are in reverse relation to each other and connected at one end by links 32$^a$ and 32$^b$ to the bolt 24 moving in the slots 25.

The organizations thus far described are particularly adapted for longitudinal application relatively to the side portions of the vehicle body and running gear and frame or chassis. The organizations shown by Figs. 12 to 16, inclusive, are constructed for application transversely with relation to the body and frame and running gear and over the rear axle. The structure shown by Figs. 12 and 13 is reversed relatively to the structure shown by Figs. 3 and 4, and comprises an upper spring 34 centrally connected to and supporting the body 5, an intermediate spring 35 centrally attached to the upper portion of an intermediate beam or frame member 36, and a lower spring 37 attached at its center to the lower portion of the said frame member 36 and its ends secured by clips 38 to the axle 39. The springs 34, 35 and 37 all have their convex sides uppermost, and the ends of the springs 34 and 35 are movably connected to the upper and lower ends of arms or levers 10 and 11 similar to the same devices shown in preceding figures of the drawings. The upper ends of the arms or levers 10 and the lower ends of the arms or levers 11 are connected by links 40 and 41, respectively, to the bolts 21 and 24 moving in slots 22 and 25 of the bars 13 of the intermediary support 8, said bolts being terminally secured to compensators or bars 19 as in the preceding structures. In the organization shown by Figs. 14 and 15 the general structure is similar to the organization shown by Figs. 12 and 13, but the spring 37 of the latter organization is omitted and the intermediary support or frame 8 is attached at its ends to the axle 39, while the lower spring 35 performs the functions of a take-up spring or shock absorber and not those of a direct bearing spring. In other respects the parts of the organization shown by Figs. 14 and 15 are precisely similar to those of the organization shown by Figs. 12 and 13 and the same reference characters are used to designate the corresponding parts.

In the organization shown by Fig. 16 the intermediary support or frame 8 will have its ends secured to the axle, but the lower spring 37, as shown by Fig. 12, is reversed in position in the organization shown by Fig. 16 and becomes an upper body supporting spring 42 and has its ends movably connected to the said body and its center secured to the center of the spring 34 by a frame member 43. In other structural particulars the organization shown by Fig. 16 is similar to that illustrated by Fig. 14, and the springs 34 and 35 are connected at their ends in the same manner to the intermediary support or frame 8, and spring 34 again acts as a takeup or shock absorbing spring.

The intermediary support or frame embodied in the several organizations herein described is movably attached to the body or a portion of the body in some instances, and also positively fixed to the axle, and in other arrangements this support or frame is free of attachment to any part of the body or axle and practically floats or is suspended and in all cases it has a motion independent of the body. In all the arrangements or modes of attachment thereof the function of this device remains the same, and that is, as an intermediary or intermediate member between the springs themselves, or between part of the group of springs and the body or axle, and having the main function of sustaining the springs in their rebound and sway, neutralizing and suppressing shocks and assisted by the arms or levers and links, which in the several associations heretofore explained ease the movements of the springs in assuming abnormal positions and their return to normal positions; and also by the shiftable compensators or bars in some instances carried by the said intermediary support or frame. Moreover, the pairs of arms or levers and the pairs of links are shown in their various forms as instances of practical connecting means to compensate for the movements of the several parts and especially the springs, but the invention is not limited to these devices nor to their arrangement in pairs, as other analogous structures may be used to movably connect the springs to the intermediary support or frame to set up a compensating and equalizing action.

It will also be understood that changes in the proportions, dimensions and minor details of the several organizations may be adopted at will within the scope of the invention to accommodate various applications of the same to different kinds of vehicle bodies, frames and running gear.

What is claimed is:

1. A spring organization of the class specified for operation with a vehicle body and running gear, comprising leaf springs and an intermediate independent rigid support, the said springs being attached in part to the vehicle body, the axle of the running gear and having extremities thereof pivotally connected to said rigid support.

2. A spring organization of the class specified for operation with a vehicle body, frame and running gear, comprising a group of springs, an intermediate horizontally disposed rigid support, and movable connecting devices interposed between portions of said springs and the support and pivoted intermediate their ends to the support.

3. A spring organization of the class specified for operation with a vehicle body, frame and running gear, comprising spaced leaf springs, an intermediate rigid support movable relatively to the body, and pairs of rebound and sway neutralizing arms pivotally connected to portions of said intermediate support and springs.

4. A spring organization of the class specified for operation with a vehicle body, frame and running gear, comprising a group of interacting leaf bearing springs arranged in superposed relation and an intermediate rigid support, and rebound and sway neutralizing arms pivotally connected to said springs and said rigid support.

5. A spring organization of the class specified for operation with a vehicle body, frame and running gear, comprising a group of interacting leaf springs, and an intermediate rigid support having pivoted thereto devices crossing the same and connected to portions of and movable with the springs and providing means for compensating and neutralizing spring action relatively to the body by the rebound and sway of the springs.

6. A spring organization of the class specified for operation with a vehicle body, frame and running gear, comprising a group of interacting leaf springs mounted to have opposite directions of motion when subjected to abnormal stress, an intermediate rigid support having said springs attached thereto, a support longitudinally disposed between portions of the springs and provided with devices extending across and movably connected thereto and to parts of the springs, and a neutralizing action relatively to said springs relatively to the vehicle body by a sudden upward thrust of the axle or by the rebound and sway of the springs when the latter are relieved of abnormal stress.

7. A spring organization of the class specified for operation with a vehicle body, frame and running gear, comprising a group of superposed leaf springs having opposite directions of motion when subjected to abnormal stress, and an intermediate rigid support having movable devices connected to portions of the springs and shifting means carried by said support, the support, movable devices and shifting means setting up a compensating and neutralizing action relatively to said springs relatively to the vehicle body by a sudden upward thrust of the axle or by the rebound and sway of the springs when the latter are relieved of abnormal stress and return to normal position.

8. A spring organization of the class specified for operation with a vehicle body, frame and running gear, comprising a group of leaf springs in part connected to the body and having an upward movement when subjected to abnormal stress, and an intermediate rigid support extending longitudinally relatively to the springs and having movable devices disposed across and intermediately pivotally attached to the support and terminally connected to ends of the springs, and shifting means carried by said support, said support, movable devices and shifting means setting up compensating and neutralizing actions relatively to said springs to check vibration of the vehicle body by a sudden upward thrust of the axle or by the rebound and sway of the springs when the latter are relieved of abnormal stress and return to normal positions.

9. A spring organization of the class specified for operating with a vehicle body, frame and running gear, comprising an upper and a lower leaf bearing spring and an intermediate take-up or shock absorbing spring interposed longitudinally between the said bearing springs, an intermediate rigid support between the springs, and movable connecting devices interposed between portions of the said springs and the support, the support consisting of pairs of longitudinally arranged bars and the devices embodying pairs of arms extending across the bars, the bars and arms operating to set up compensating and neutralizing actions when the springs are subjected to stress and to check vibrations of the vehicle body by rebound or sway of the springs when the latter are relieved of abnormal stress and return to normal position.

10. A spring organization of the class specified for operating with a vehicle body, frame and running gear, comprising a group of leaf springs, an intermediate rigid support, movable connecting devices interposed between portions of said springs and pivotally attached to the support, and shifting bars to which the springs are in part connected for bracing the said movable devices to synchronize their motions and check a longitudinal displacement of the springs relative to the support when the axle receives a sudden longitudinal thrust or jar.

11. A spring organization of the class specified for operating with a vehicle body, frame and running gear, comprising an intermediate rigid support, a leaf bearing spring, an auxiliary take-up or shock absorbing spring, movable connecting devices interposed between portions of said springs and the support and extending across the latter, and means shiftably carried by the support for bracing the said movable devices to synchronize their motion and check a longitudinal displacement of the springs relative to the support when the axle receives a sudden longitudinal thrust or jar.

12. A device of the class described comprising a plurality of spaced spring members, a longitudinally extending central bar, links connected to the said central bar and pivotally connected to said spring members and adapted to be forced outwardly as said spring members are compressed toward each other.

In testimony whereof I have hereunto set my hand in presence of two subscribing witnesses.

JOSEPH B. KINCER.

Witnesses:
 DOROTHY W. TERRY,
 URBAN E. GOERNER.